Figure 1:
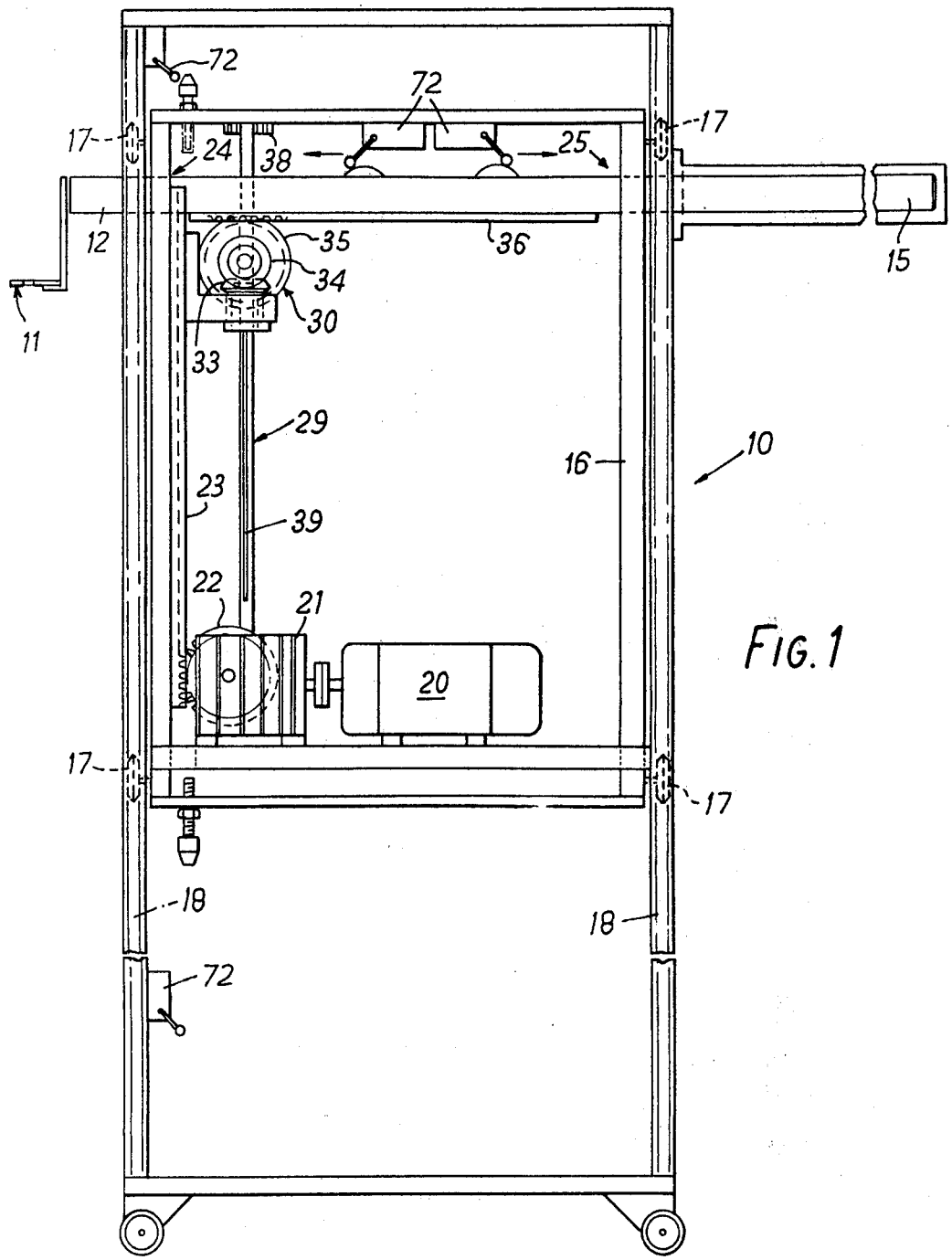

United States Patent [19]
Chambers

[11] 3,934,732
[45] Jan. 27, 1976

[54] OBJECT TRANSFER MACHINE
[75] Inventor: Arnold Chambers, Chesterfield, England
[73] Assignee: Glass Tubes and Components Limited, Chesterfield, England
[22] Filed: July 22, 1974
[21] Appl. No.: 490,697

[30] Foreign Application Priority Data
Aug. 9, 1973 United Kingdom............... 37844/73

[52] U.S. Cl............................. 214/1 BB; 214/1 BT
[51] Int. Cl.²........................................... B23Q 7/04
[58] Field of Search ..... 214/1 BB, 1 BT, 1 BH, 1 B, 214/1 BD, 1 BC, 1 BV

[56] References Cited
UNITED STATES PATENTS
| | | | |
|---|---|---|---|
| 2,833,434 | 5/1958 | Stover | 214/1 BH X |
| 3,025,977 | 3/1962 | Biddison | 214/1 BD |
| 3,075,651 | 1/1963 | Kaden | 214/1 BB |
| 3,770,140 | 11/1973 | Dukette | 214/1 BB |

Primary Examiner—Robert J. Spar
Assistant Examiner—George F. Abraham
Attorney, Agent, or Firm—Robert F. O'Connell

[57] ABSTRACT

An object transfer machine has a carrier with separate reversible drives for vertical and horizontal motions controlled by a bank of control cams driven through a control cycle by a motor, each cam causing one of the drives to operate for a set period in the required direction.

5 Claims, 6 Drawing Figures

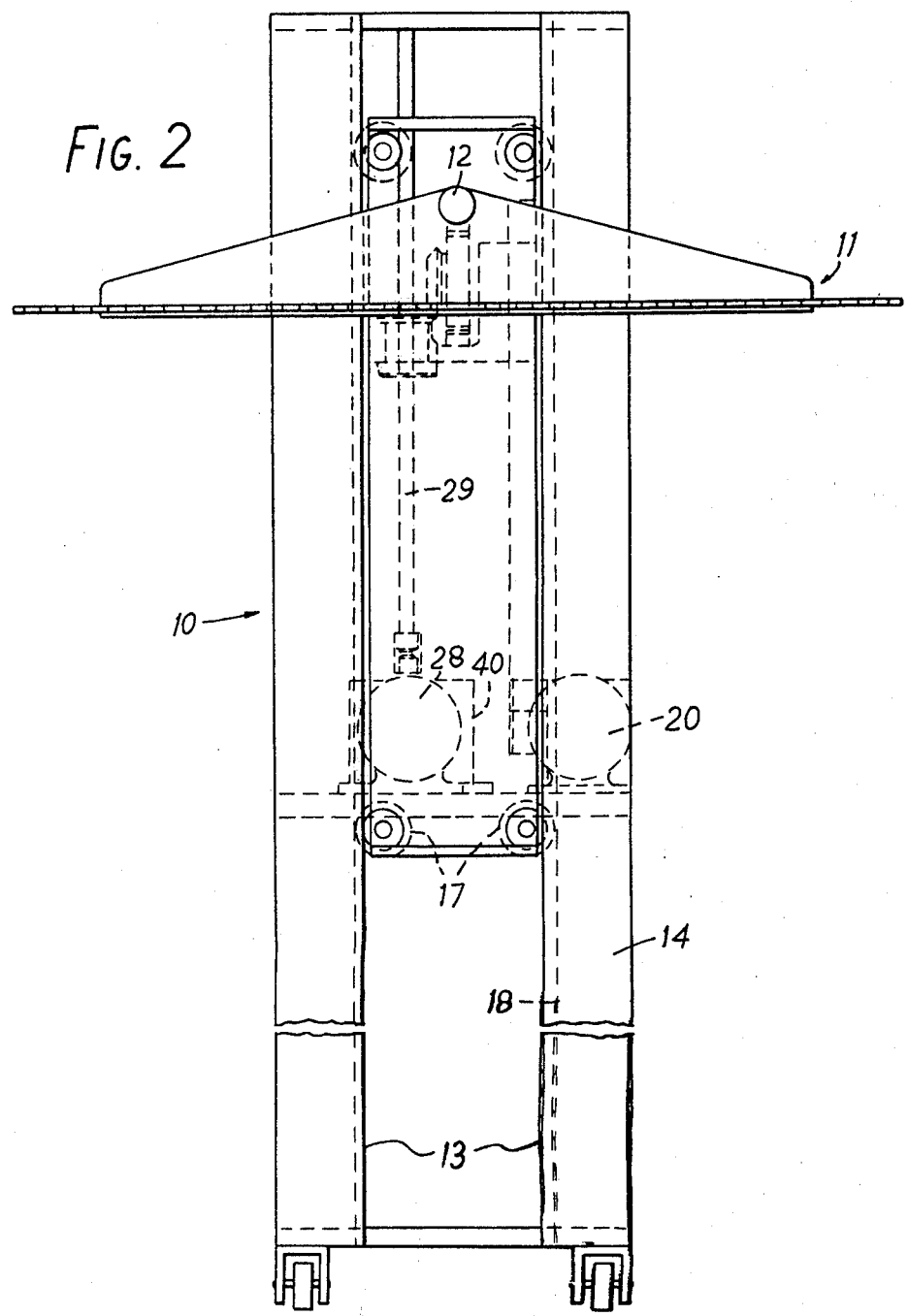

OBJECT TRANSFER MACHINE

The present invention relates to a machine for transferring objects from one work station to another, particularly but not exclusively for use in a glass-making factory.

The object of the invention is to provide an inexpensive machine capable of executing a series of movements for transferring objects between work stations which are spaced vertically and horizontally.

According to the present invention, there is provided a machine for transferring objects from one work station to another, comprising an object carrier guided for vertical and horizontal movements, a first reversible drive means for raising and lowering the object carrier, a second reversible drive means for moving the object carrier horizontally to and fro, and mechanism for controlling the operation of the two reversible drive means, the control mechanism including a motor and a bank of control cams coupled therewith to be driven through a control cycle, the cams being operably connected to one or the other of the drive means so that each cam causes its associated drive means to operate for a predetermined period, and the cam arrangement being such that the two drive means cause the object carrier to move through a set sequence of vertical and horizontal movements during each control cycle. The number of cams in the bank is basically immaterial, the actual number being governed by the required number of individual movements in a given sequence.

The length of the "dwell" of each cam governs the fraction of the complete cycle of movements occupied by the particular movement controlled by that cam. The period during which the associated drive means operates to produce this particular movement is therefore influenced by the dwell and by the speed of the control motor. The actual distance moved by the object carrier during this particular movement depends, of course, upon the speed of operation of the drive means. For greatest versatility, it is preferred that the speeds of the two reversible drive means and the control motor can be varied. Advantageously, independently presettable speed controls are provided for the two drive means and the control motor. Conveniently, each cam is fast with a gear of a train of meshing gears driven by the control motor. The cams are thus interlocked one with another and rotate at constant rates. It is most convenient if the gearing is such that the cams all rotate at the same rate. A complete control cycle can then be accomplished by a single revolution of the control motor.

The two drive means incorporate motors which could be hydraulically or pneumatically operated. The control motor could likewise be hydraulically or pneumatically operated. It is preferred, however, for each of the motors to be electrically operated, since the operative connections between them and the cams can then be simple microswitches. Reversible drive can be obtained through reverse gearing, although considerable simplification is possible if the main drive motors are themselves reversible.

In a preferred embodiment, the object carrier is secured to a horizontally disposed, elongated arm which is guided for movement to and fro in its lengthwise direction. The arm is borne on a carriage which is guided for up and down movement in a vertical direction.

If desired, it would be possible to make the arm and object carrier execute movements other than vertical and to and for horizontal movements. Thus, the arm could be mounted on the carriage through a slideway enabling the arm to be shifted sideways parallel to its length. Furthermore, the arm could be so supported as to be able to swing about an axis at right angles to its longitudinal axis. Finally, it would be possible to arrange for the arm to revolve about its longitudinal axis. This could enable the object carrier to invert objects carried thereby. Additional drive means and control cams would, of course, be required to effect the further movements.

Figure 4:
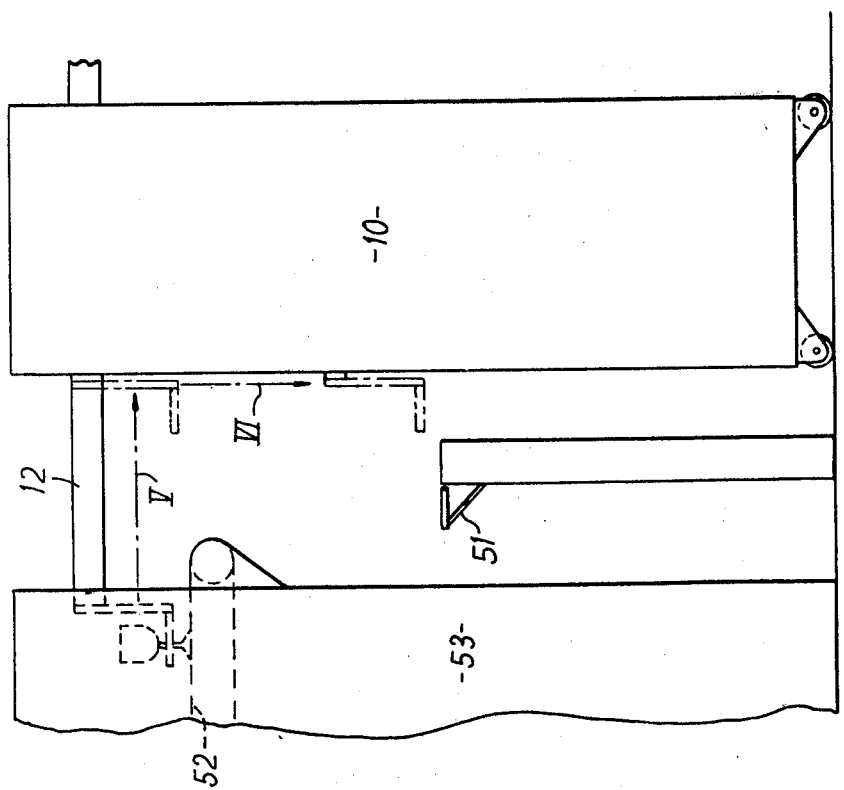
Figure 3:
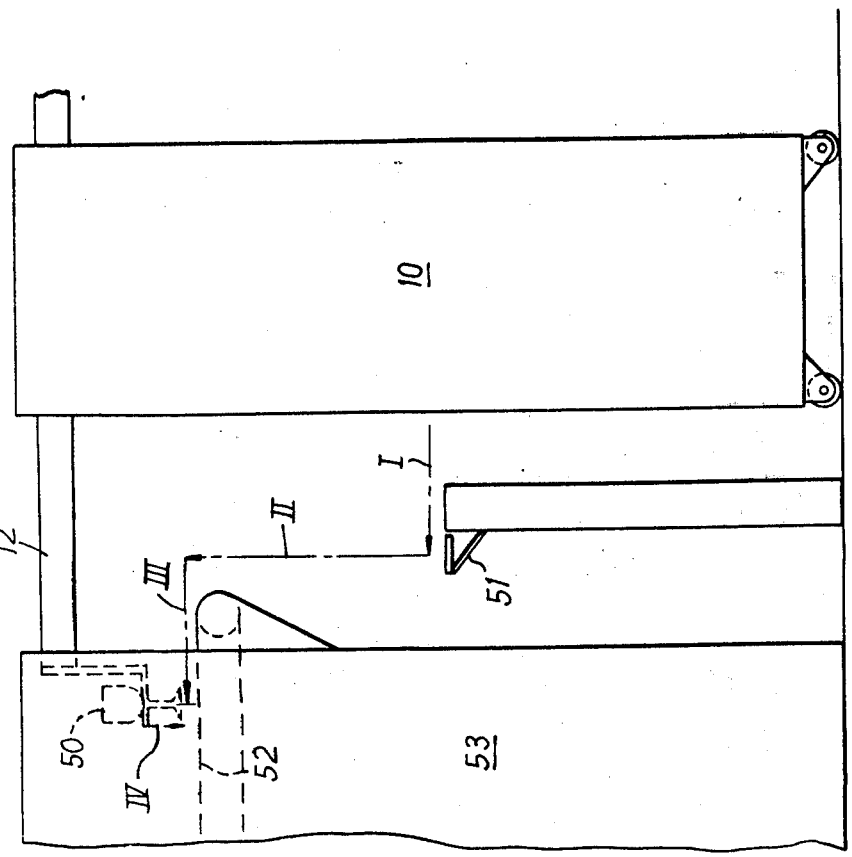
Figure 5:
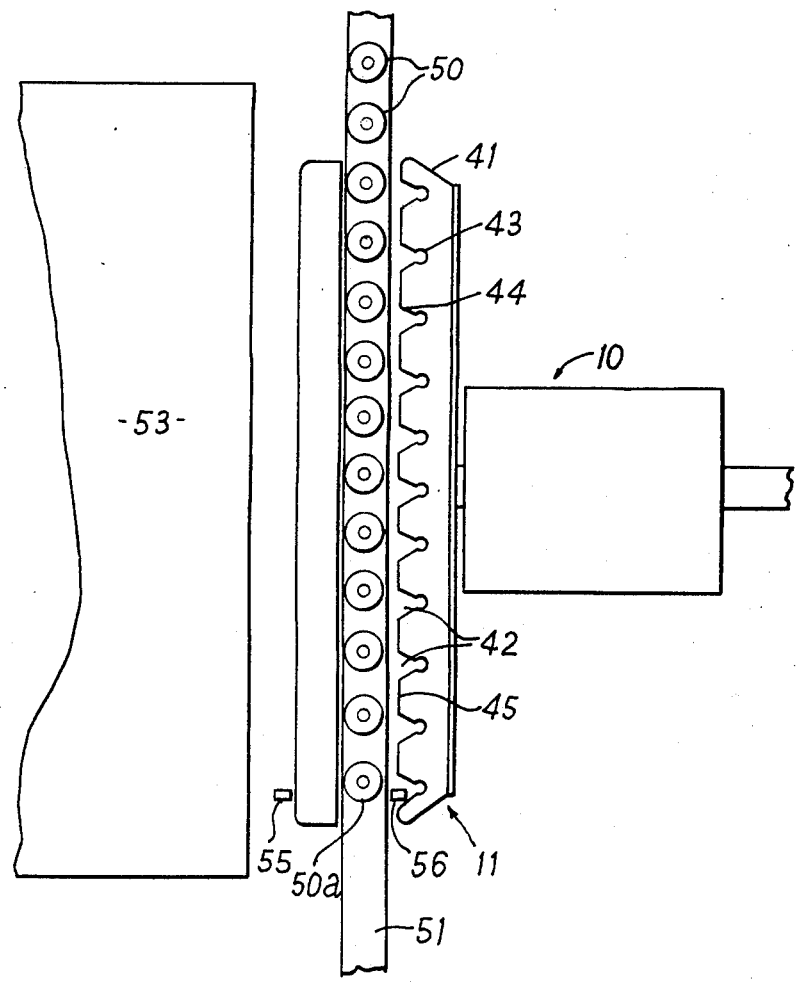
Figure 6:
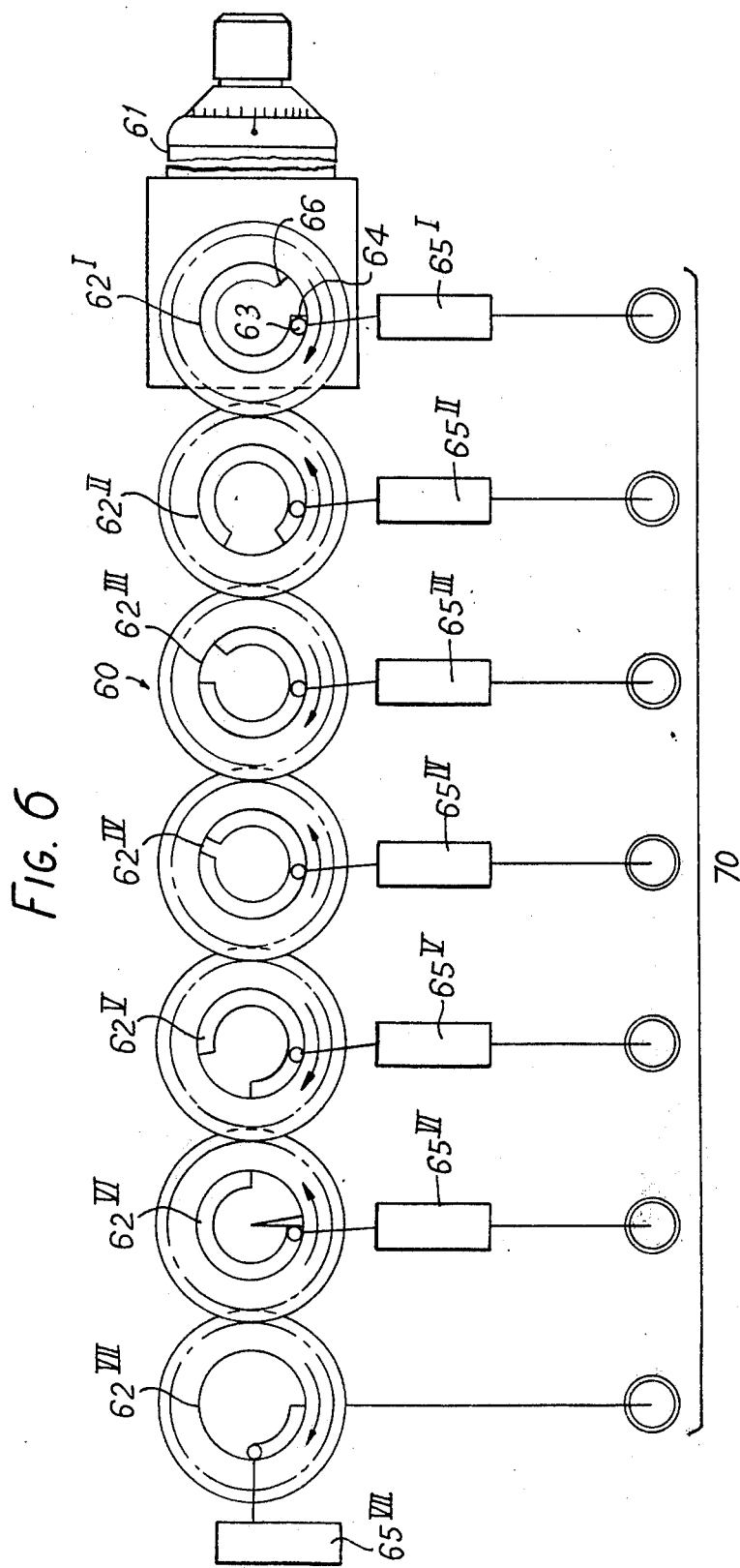

An embodiment of the present invention will now be described by way of example with reference to the accompanying drawings, in which:

FIG. 1 is a side elevation, with a side panel removed, of an object transfer machine, FIG. 2 is a front elevation of the machine shown in FIG. 1, with internal components thereof shown in dashed lines, FIGS. 3 and 4 illustrate the machine in use for carrying out a predetermined cycle of operations, FIG. 5 illustrates the machine shown in use in FIGS. 3 and 4 when viewed from above, and FIG. 6 illustrates a mechanism for controlling the machine through a predetermined cycle of operations.

The purpose of the illustrated machine 10 is to carry one or more objects from one work station to another in a production line, and is capable of raising and lowering the objects as well as moving them in a horizontal path. The machine is useful for transferring objects from one conveyor to another and for stacking the objects. The machine 10 was specifically designed for automatically transferring drinking glasses from a conveyor to a lehr, but was wider application as will be understood.

The machine 10 has an object carrier 11 which is detachably secured to a cylindrical arm or spindle 12 to enable different types of object carrier to be fitted to the machine. The arm enters the body of the machine 10 through a vertical slot 13 at the front of a surrounding cabinet 14. The back of the cabinet 14 has a similar slot to allow the end 15 of the arm remote from the carrier 11 to protrude therefrom. The end 15 is received inside a closed sleeve which protects the end 15 from dirt.

The arm 12 is supported horizontally within the cabinet 14 for up and down, and for in and out movements, i.e. for vertical and horizontal movements respectively. Inside the cabinet 14 is a carriage 16 bearing the arm 12 and having rollers 17 which run in vertically-disposed V-shaped guide tracks 18. The guide tracks 18 are attached to a main frame of the machine. A stationary support plate 19 is attached to the main frame and bears an electric drive motor 20 for driving the carriage 16 and hence the arm vertically. Motor 20 is coupled through a direction-changing gear box 21 to a pinion 22 which meshes with a rack 23 secured to the carriage 16. It will be appreciated that, depending upon the direction in which the pinion 22 is driven, the carriage 16 and hence the arm 12 will be raised or lowered, guided by the tracks 18.

At the front and back of the carriage 16, that is at 24 and 25, the arm 12 is journalled for reciprocating in and out movement parallel to its longitudinal axis. There are three journals equispaced about the circumference of the arm 12 at both 24 and 25. In each case, one journal which preferably is uppermost, is spring loaded to accommodate wear between the arm and the journals. The journals are of any convenient form and have been omitted from the drawings for simplicity.

Horizontal in and out movement of the arm 12 is obtained by a second electric drive motor 28 mounted on the support plate 19 a drive spindle 29 and a gear train 30. The gear train 30 is borne by a bracket 31 secured to the carriage 16, and the individual gears are fast with spindles running in ball races mounted in the bracket 31. The gears comprise two meshing bevel gears 33, 34 and a spur gear 35. The bevel gear 34 and the spur gear 35 are fast with a common spindle and hence rotate together. The spur gear 35 meshes with a rack 36 secured to the arm 12. The bevel gear 33 is mounted on the bracket 31 through a thrust race and locking collar 37 which prevent play between bracket and gear but allow the gear 33 to revolve freely.

The drive spindle 29 is supported vertically and rotatably on the carriage 16 by the bevel gear 33 and the bracket 31, and by a ball race 38 fitted to the top of the carriage 16. The spindle 29 is fast with the bevel gear 33 so that when the spindle 29 is rotated, the gear train 33, 34, 35 is set in motion to drive the arm 12 via the rack 36.

The spindle 29 cannot be directly coupled to the drive motor 28, or to a gear box associated therewith. This is because the spindle 29 moves up and down with the carriage 16 whilst the motor is stationary upon the fixed plate 19. A lost-motion coupling is therefore required. The motor 28 drives a shaft, not visible in the drawings, which is telescoped into an axial bore in the spindle. The shaft is coupled to the spindle to rotate the latter by a suitable key connection. In this case, the connection is via a pin carried by the shaft and a slot 39 in the wall of the spindle 29. At its lower end the shaft is coupled through a reduction gear box 40 to the drive motor 28.

The machine 10 is designed to move the object carrier 11 from a starting position to a first work station, thence to a second work station and then back again to the starting position. This requires that the vertical and horizontal drives, comprising the parts 20 to 23 and 28 to 30 and 36 respectively, be reversible. Most economically, reversible drive is obtained by employing reversible motors 20, 28. Alternatively, the motors 20, 28 could be unidirectional, reverse drive being obtained by means of reverse gearing and magnetic clutches. This would be rather more complex and costly, however. The preferred reversible motors 20, 28 are of infinitely variable speed and are provided with conventional speed controls, not shown, which allow the motors to be independently controlled. They are fitted with dynamic braking.

The precise nature of the object carrier 11 will depend upon the type of objects to be handled. In the drawings, wherein the machine 10 is for use in a glasswork factory, the carrier 11 includes a notched plate 41, see FIG. 5. The notches 42 are equally spaced along the plate 41 and each has an inner, circular portion 43 and a V-shaped outer portion 44 which opens to the free edge 45 of the plate 41. The plate 41 is made from a temperature resistant material which will not crack or check the surfaces of hot glasses when in contact therewith. A suitable material, based upon asbestos, is supplied by Turner Newal Ltd., under the name "SINDANYO".

A typical sequence of movements of the object carrier 11 is shown in FIGS. 3 to 5, wherein the machine 10 is employed for transferring stem glassware 50 from a first conveyor 51 to a second conveyor 52 in a lehr 53. It will be seen that the conveyors are at different heights above the floor and are spaced apart horizontally.

At an appropriate moment, governed by a glass 50a interrupting a beam of light from a source of light 55 to a photoelectric cell 56, the machine 10 is set in motion. First, the horizontal drive is initiated to move the arm 12 and object carrier 11 outwardly a pre-set distance from the starting position which is shown in FIG. 5. This is movement I in FIG. 3. This advances the notches 42 until the stems of the glasses are located within the inner notch portions 43, whereupon the horizontal drive terminates. The plate 41 is approximately half way up the stems. Next, the vertical drive is set in motion, whereby the plate 41 engages the bowls of the glasses and raises them, during movement II, to just above the level of conveyor 52. When movement II is completed, the vertical drive stops and the horizontal drive is initiated to advance the object carrier 11 and arm 12 outwardly once more, movement III. Once this movement is accomplished, the glasses 50 are directly above the conveyor 52. Next, the vertical drive is initiated, in a reverse direction, to lower the glasses onto conveyor 52. Upon completion of this movement IV, the plate 41 is located about half-way up the stems of the glasses 50 which are therefore free to be withdrawn by the conveyor 52 from the notches 42. The machine 10 is then zeroed to return the object carrier 11 and arm 12 to their starting position. Zeroing is accomplished by movements V and VI, during which the horizontal and vertical drives are driven in reverse.

Control of the vertical and horizontal drives is effected by a mechanism shown in FIG. 6. The control mechanism 60, which makes and breaks a series of switches which start and stop the vertical and horizontal drive motors 20, 28 includes a small, fractional horse-power electric motor 61 which is of infinitely variable speed. The motor 61 drives a set or bank of cams through a train of enmeshed gears 62, which are interlocked with the cams. The gearing is designed to drive the cams at equal speeds. In view of the interlocking of the cams and the fact that they rotate at the same speed, the "timing" of the cams can be set through 360°. Thus, one complete revolution of the motor 61 be arranged to control the complete cycle of movements I–VI.

When, at the beginning of a cycle, the motor 61 is started, the gears 62 and cams begin rotating. Cam $62^I$ is shown in a setting which immediately makes a cam-follower 63 rise over a stop 64. The follower is coupled to the blade of a microswitch $65^I$ connected in circuit with the horizontal drive motor 28. As the follower 63 rises over the step 64, the switch $65^I$ starts motor 28. The motor 28 continues operating, while cam $62^I$ rotates, to advance the object carrier 11 and arm 12 through the movement I, until the follower 63 drops down at step 66. As the follower 63 drops of the step 65, the switch 65 opens and switches off the motor 28, movement I now being completed. For the remainder of the cycle cam $62^I$ and switch $65^I$ play no part in controlling the motor 28.

By the time cam $62^I$ has rotated sufficiently to open switch $65^I$, a step on cam $62^{II}$ has been brought into coincidence with a follower which controls switch $65^{II}$.

Switch $65^{II}$ closes to start the vertical drive motor 20, causing the carriage 16 to rise. The object carrier 11 and arm 12 are then executing movement II.

Cams $62^{III}$ to $62^{VI}$, and their associated microswitches $65^{III}$ to $65^{VI}$ operate in the same way as described in detail with reference to cams $62^{I}$, $62^{II}$ and switches $65^{I}$, $65^{II}$. The cams $62^{III}$ to $62^{VI}$ control movements III to VI of the operating cycle of the machine 10. The dwells of the cams, i.e. the periods during which the cams allow their associated motors 20, 28 to operate, differ from one cam to the next according to a predetermined pattern, so that the movements I to VI occupy different fractions of the complete control cycle. The individual dwells and the speeds of the motors 20, 28 and 61 therefore govern the distances moved by the object carrier 11 during the movements I to VI. It will be appreciated that switches $65^{IV}$ to $65^{VI}$ cause their associated drive motors 20, 28 to function in reverse, whereas switches $65^{I}$ to $65^{III}$ cause the motors to function in forward.

Cam $62^{VII}$ and its associated switch $65^{VII}$ operate to switch off the control motor 61 at the end of a cycle, the machine remaining idle until it is required to repeat the sequence of movements I to VI. The machine 10 is started again when another glass interrupts the light beam falling on the photocell 56. The exact way in which the photocell 56 starts the control motor 61 is immaterial. There should be a time delay between the photocell 56 actuating the motor 61 and initiating movement I, to ensure that the glasses arriving on conveyor 51 have reached positions central relative to the notches 42.

The control mechanism comprising the motor 61, cams $62^{I}$ to $62^{VII}$ and microswitches $65^{I}$ to $65^{VII}$ can be mounted in any convenient position within the cabinet 14 of the machine 10. If desired, and as shown, indicator lights 70 can be connected in circuit with the microswitches to show at a glance in which phase of its cycle the machine 10 is functioning.

It will be understood that the machine 10 and its control mechanism is very versatile. The distances moved by the object carrier 11 are widely adjustable and can be exactly controlled by appropriate adjustment of the speed controls of the motors 20, 28. The frequency at which the individual movements I to VI are accomplished, which likewise affects the overall distances moved by the carrier 11, is controllable by adjusting a speed control (not shown) of the control motor 61. Further versatility is attainable if the cams are replaced by cams having different dwells to alter the points in the control cycle at which certain movements of the sequence are executed and the fraction of each control cycle occupies by any given movement. For safety, the machine 10 is provided with a set of limit switches 72 for switching off the motors 20, 28 to prevent overloading thereof and to restrict the movement available to the carriage 16 and arm 12.

Whilst the illustrated embodiment uses six cams and switches — giving twelve switching operations — further cams and switches may be added where a more complex cycle of movements is required of the object carrier 11. Although the machine 10 as described executes vertical and horizontal movements in turn, there is no fundamental reason why the cams should not be arranged to allow the main motors 20, 28 to operate simultaneously. The exact sequence of movements can be easily set by the manufacturer to fulfil customers different requirements, or by the customers themselves. Apart from selecting and arranging appropriate cams, substantially no modifications are necessary to allow the machine to make many diverse sequences of movements. Adapting the machine to conduct a new sequence of movements is very inexpensive: the cost is limited to the cost of replacement or additional cams. Furthermore, the control mechanism itself is particularly simple and inexpensive, so that little capital is tied up in the equipment.

The described machine 10 can handle hot stemward glasses and tumblers without marking or damaging them in any way, and can cope with many varieties of shapes and sizes. The machine 10 operates smoothly, and since glasses merely rest on the object carrier 11, without being gripped thereby, a minimum of vibration is to be expected. The machine is substantially unaffected by high ambient temperatures.

The present invention is particularly applicable to a stemware lehr stacker and such a stacker, as described in detail above, has numerous advantages over the prior lehr stackers. The present stacker is able to pick up stemware glasses standing upright on a conveyor and to set them positively on a lehr belt. Prior stackers can only shift stemware glasses by pushing them fron one conveyor to another, and such equipment is only practicable for handling glasses which are inverted, bowl down. It is disadvantageous, however, to have to anneal glasses when upside down, and this disadvantage is readily avoided if the present stacker is employed.

The drive means and control mechanism are contained in a single unit forming the present stacker, and are most conveniently constituted by standard, commonly available parts, irrespective of the control requirements. It will be appreciated that the construction described above can provide a particularly versatile yet inexpensive machine.

I claim:

1. A machine for transferring objects from one work station to another, comprising an object carrier guided for vertical and horizontal movements, a first reversible drive means for raising and lowering the object carrier, a second reversible drive means for moving the object carrier horizontally to and fro, and mechanism for controlling the operation of the two reversible drive means, the control mechanism including a motor, a plurality of gears driven by said motor, said gears being in mesh with one another to form a gear train, and a bank of control cams, each of said control cams being fast with a respective one of said gears to be driven through a control cycle, each of the cams being operably connected to a selected one of said first and second drive means to cause said selected drive means to operate for a predetermined period, and the cam arrangement being such that the two drive means cause the object carrier to move through a set sequence of vertical and horizontal movements during each control cycle.

2. A machine as claimed in claim 1 including independent pre-settable speed controls for each of the two reversible drive means and for the control motor driving the cams.

3. A machine as claimed in claim 1 in which each of said first and second reversible drive means comprises an electric motor.

4. A machine as claimed in claim 3, in which each of said electric motors is reversible.

5. A machine as claimed in claim 1 comprising a carriage, means guiding the carriage for up and down movement in a vertical direction, and a horizontally-disposed arm mounted on the carriage for movement to and fro in the direction of its length, the object carrier being secured to the said arm.

* * * * *